United States Patent
Hu

(10) Patent No.: US 11,765,076 B2
(45) Date of Patent: Sep. 19, 2023

(54) DISTRIBUTED SPANNING TREE PROTOCOL

(71) Applicant: ARRIS Enterprises LLC, Suwanee, GA (US)

(72) Inventor: Maocheng Hu, San Jose, CA (US)

(73) Assignee: ARRIS Enterprises LLC, Suwanee, GA (US)

( * ) Notice: Subject to any disclaimer, the term of this patent is extended or adjusted under 35 U.S.C. 154(b) by 0 days.

(21) Appl. No.: 17/394,640

(22) Filed: Aug. 5, 2021

(65) Prior Publication Data

US 2022/0045943 A1 Feb. 10, 2022

Related U.S. Application Data

(60) Provisional application No. 63/061,978, filed on Aug. 6, 2020.

(51) Int. Cl.
*H04L 45/48* (2022.01)
*H04L 49/00* (2022.01)
(Continued)

(52) U.S. Cl.
CPC .............. *H04L 45/48* (2013.01); *H04L 45/02* (2013.01); *H04L 45/586* (2013.01); *H04L 49/30* (2013.01)

(58) Field of Classification Search
CPC ..... H04L 12/4641; H04L 45/48; H04L 41/12; H04L 45/28; H04L 45/22; H04L 45/245; H04L 12/462; H04L 45/00; H04L 45/02; H04L 12/4625; H04L 49/351; H04L 45/18; H04L 45/66; H04L 49/354; H04L 47/10; H04L 12/4633; H04L 49/70; H04L 47/125; H04L 41/145; H04L 45/16; H04L 41/0893; H04L 41/0806; H04L 41/40; H04L 12/66; H04L 12/437; H04L 43/0852; H04L 45/586; H04L 41/0668; H04L 47/32; H04L 45/24; H04L 45/04; H04L 65/1069; H04L 69/22; H04L 43/10; H04L 41/0895;
(Continued)

(56) References Cited

U.S. PATENT DOCUMENTS

2004/0174887 A1* 9/2004 Lee ..................... H04L 12/4641
370/395.53
2007/0165518 A1* 7/2007 Bruckman ............ H04L 12/437
370/222
(Continued)

*Primary Examiner* — Djenane M Bayard
(74) *Attorney, Agent, or Firm* — Steven Stupp; Stewart Wiener

(57) ABSTRACT

An electronic device that includes a stack of multiple computer network devices (such as switches) that implement a spanning tree using a distributed spanning tree protocol (STP) is described. A given computer network device may create a virtual internal stacking port. This virtual internal stacking port is included in the spanning tree and provides stacking interface logic that allows the given computer network device to connect to a virtual hub in the stack that is common to the multiple computer network devices. Moreover, the given computer network device may run an instance of the distributed STP that controls ports in the given computer network device, where the instance of the distributed STP run by the given computer network device uses a bridge identifier that is common to the multiple computer network devices.

20 Claims, 9 Drawing Sheets

(51) Int. Cl.
*H04L 45/586* (2022.01)
*H04L 45/02* (2022.01)

(58) Field of Classification Search
CPC ............. H04L 43/0811; H04L 49/3009; H04L 41/0873; H04L 43/0829; H04L 41/0654; H04L 45/50; H04L 12/18; H04L 12/4645; H04L 41/0213; H04L 41/0803; H04L 41/0816; H04L 41/22; H04L 45/745; H04L 45/64; H04L 45/74; H04L 2101/622; H04L 69/324; H04L 12/467; H04L 49/25; H04L 49/352; H04L 43/16; H04L 49/602; H04L 41/0853; H04L 43/50; H04L 49/15; H04L 43/0817; H04L 45/54; H04L 65/1101; H04L 12/5601; H04L 12/6418; H04L 41/122; H04L 67/10; H04L 65/80; H04L 9/40; H04L 12/42; H04L 69/16; H04L 12/46; H04L 41/0866; H04L 45/125; H04L 41/0813; H04L 43/087; H04L 47/12; H04L 49/552; H04L 63/0428; H04L 63/062; H04L 63/0823; H04L 63/068; H04L 45/12; H04L 45/76; H04L 45/488; H04L 12/44; H04L 45/52; H04L 47/41; H04L 47/70; H04L 49/253; H04L 43/08; H04L 43/20; H04L 45/32; H04L 47/20

See application file for complete search history.

(56) References Cited

U.S. PATENT DOCUMENTS

| | | | |
|---|---|---|---|
| 2008/0031266 A1* | 2/2008 | Tallet | H04L 12/462 370/389 |
| 2011/0213869 A1* | 9/2011 | Korsunsky | G06F 21/55 709/223 |
| 2018/0302315 A1* | 10/2018 | Kamisetty | H04L 12/462 |

* cited by examiner

DISTRIBUTED SPANNING TREE PROTOCOL

CROSS REFERENCE TO RELATED APPLICATIONS

This application claims priority under 35 U.S.C. 119(e) to: U.S. Provisional Application Ser. No. 63/061,978, "Distributed Spanning Tree Protocol," filed on Aug. 6, 2020, by Maocheng Hu, the contents of which are herein incorporated by reference.

FIELD

The described embodiments relate to techniques for implementing a distributed spanning tree protocol (STP) among stacked computer network devices (such as network switches), which is converged without or with reduced network broadcasts (such as bridge protocol data unit or BPDU broadcasts).

BACKGROUND

The STP is a network protocol that can be used to build a loop-free logical topology for a network, such as an Ethernet network. Notably, STP may be used to prevent bridge loops and network broadcasts that results from them. Moreover, a spanning tree may allow a network design to include backup links that provide fault tolerance if an active link fails.

As the name suggests, the STP may create a spanning tree that characterizes the relationship of nodes within a network of connected layer-2 (L2) bridges, and may disable those links that are not part of the spanning tree, leaving a single active path between any two network nodes. Note that the STP is standardized as Institute of Electrical and Electronics Engineers (IEEE) 802.1D. In addition, a rapid STP is standardized as IEEE 802.1w, which is backwards compatible with IEEE 802.1D. In the discussion that follows, these embodiments are referred to collectively as the 'STP.'

In many implementations, the STP is implemented in a centralized manner. For example, in a stack of computer network devices (such as a stack of network switches, which are sometimes referred to as 'switches'), one of the computer network devices may run the STP for all of the ports in all of the computer network devices in the stack. This computer network device is assigned as an active unit in the stack and is sometimes referred to as a 'centralized control unit.'

However, in a centralized implementation, the active unit that performs the computations in the STP may have very high processor usage and, thus, may become a bottleneck for the performance of the stack. For example, the active unit may receive BPDUs from all of the other computer network devices in the stack for processing. In addition, the active unit may provide, to the other computer network devices the STP state setting and media access control (MAC) flush operation, which originate from and are triggered by the STP executing on the active unit.

These problems may be exacerbated when the stack includes a large number of ports (such as thousands of ports). For example, in a stack with three network switches that each have 48 ports, there are a total of 144 ports. Because of the high port count, the active unit may run into a high processor condition that can cause other failures or an L2 broadcast storm when the STP is unable to converge quickly. Consequently, existing centralized implementations of the STP may not scale.

In principle, these problems can be addressed by using a distributed implementation of the STP, so that the other computer network devices in the stack share the computational and resource burdens associated with the STP. In practice, it is typically difficult to implement the STP in a distributed manner while maintaining compliance with the associated IEEE standards. For example, if each computer network devices in the stack implements a locally distributed STP to control their own ports, there is usually still a need for the locally distributed STPs to obtain the full picture or situational awareness of the STP network of the stack in order to provide the same behavior as in the centralized implementation (i.e., the local distributed STPs typically need to be converged into a single STP network). Therefore, in these distributed implementations the local STP information is often exchanged among the computer network devices in the stack using BPDU broadcasts. However, the BPDU broadcasts increase the internal traffic burden in the stack and, thus, may also not scale.

SUMMARY

An electronic device is described. This electronic device may include a stack of multiple computer network devices (such as switches) that implement a spanning tree using a distributed STP. A given computer network device in the stack may include: a processor; and a memory that stores program instructions, where, when executed by the processor, the program instructions cause the given computer network device to perform operations. Notably, during operation, the given computer network device may create a virtual internal stacking port. This virtual internal stacking port is included in the spanning tree and provides stacking interface logic that allows the given computer network device to connect to a virtual hub in the stack that is common to the multiple computer network devices. Moreover, the given computer network device may run an instance of the distributed STP that controls ports in the given computer network device, where the instance of the distributed STP run by the given computer network device uses a bridge identifier that is common to the multiple computer network devices.

In some embodiments, the distributed STP converges without BPDU broadcasts among the multiple computer network devices.

Note that the electronic device may provide a non-blocking broadcast domain within the multiple computer network devices.

Moreover, the virtual internal stacking port may support STP port state machines. For example, the supported STP port state machines may include a transmit/receive state machine.

Furthermore, the virtual internal stacking port may have STP awareness over the multiple computer network devices in the stack. For example, the virtual internal stacking port may aggregate information associated with the distributed STP over the multiple computer network devices in the stack. Notably, the information may include a protocol view of ports in the multiple computer network devices (such as forwarding or blocking) and mapping to the (hardware) ports. In some embodiments, the virtual internal stacking port may run a spanning tree state match to obtain the information for virtual internal stacking ports in the multiple computer network devices. Note that the spanning tree match may use control packets, such as inter-process command (IPC) messages.

Additionally, the spanning tree may be compatible with IEEE 802.1D and IEEE 802.1w.

In some embodiments, the virtual internal stacking port may have a protocol status of forwarding, but may be idle (e.g., incapable of forwarding packets). Notably, the virtual internal stacking port may not be mapped to a hardware (physical) port or resource.

Moreover, a largest port identifier in the given computer network device may represent the virtual internal stacking port.

Another embodiment provides a computer-readable storage medium for use with the given computer network device or the electronic device. When executed by the given computer network device or the electronic device, this computer-readable storage medium causes the given computer network device or the electronic device to perform at least some of the aforementioned operations.

Another embodiment provides a method, which may be performed by the given computer network device or the electronic device. This method includes at least some of the aforementioned operations.

This Summary is provided for purposes of illustrating some exemplary embodiments, so as to provide a basic understanding of some aspects of the subject matter described herein. Accordingly, it will be appreciated that the above-described features are examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

Figure 1:
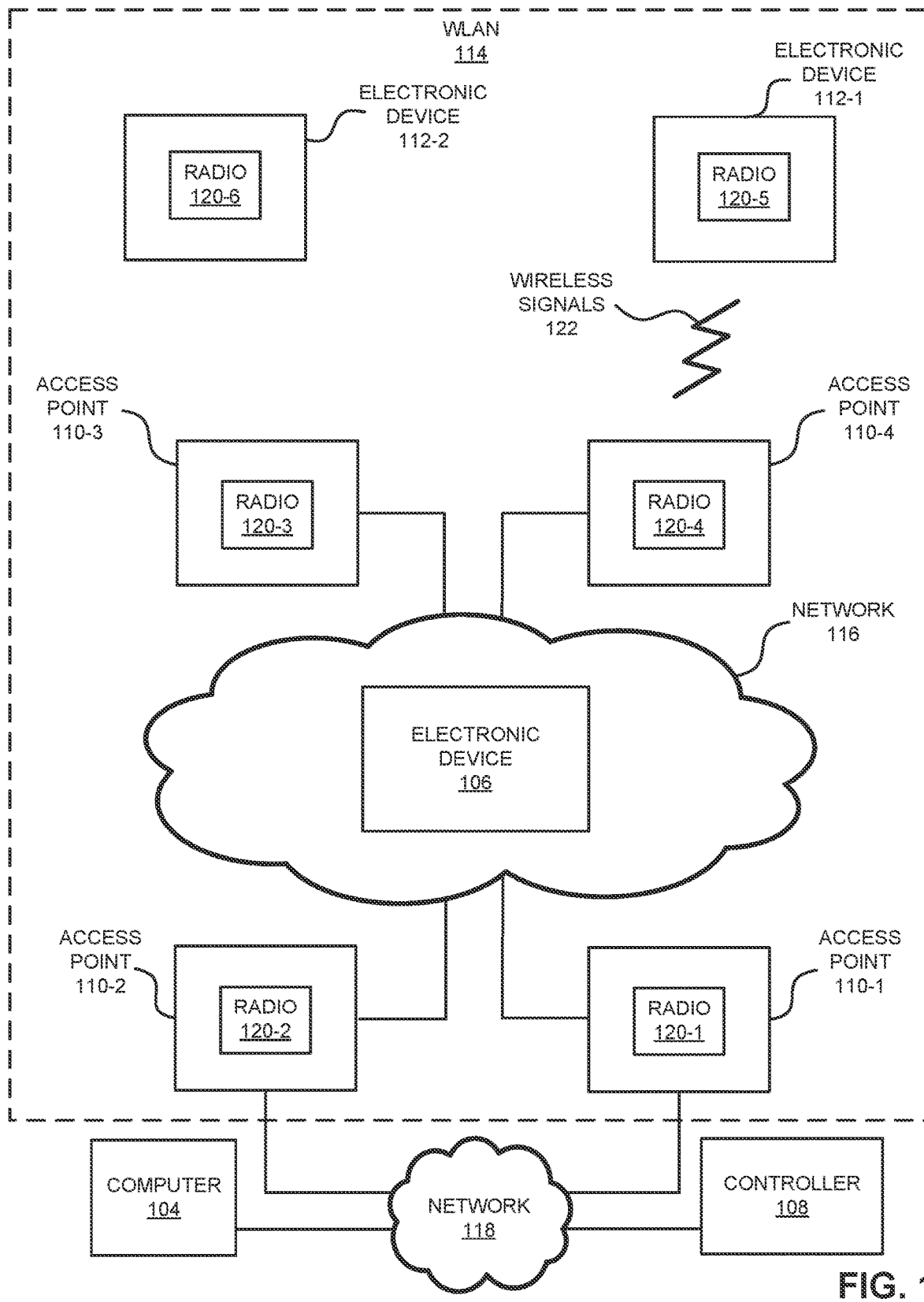
FIG. 1 is a block diagram illustrating an example of communication among access points and electronic devices in a network in accordance with an embodiment of the present disclosure.

An electronic device that includes a stack of multiple computer network devices (such as switches) that implement a spanning tree using a distributed spanning tree protocol (STP) is described. A given computer network device may create a virtual internal stacking port. This virtual internal stacking port is included in the spanning tree and provides stacking interface logic that allows the given computer network device to connect to a virtual hub in the stack that is common to the multiple computer network devices. Moreover, the given computer network device may run an instance of the distributed STP that controls ports in the given computer network device, where the instance of the distributed STP run by the given computer network device uses a bridge identifier that is common to the multiple computer network devices, and the distributed STP converges without or with reduced bridge protocol data unit (BPDU) broadcasts among the multiple computer network devices.

By connecting the given computer network device to the virtual hub in the electronic device, these communication techniques may allow the distributed STP to converge rapidly without high processor usage or an internal traffic burden in the stack. Notably, distributed STP prevents an active unit in the stack, which may otherwise implement a centralized STP, from becoming a bottleneck. Moreover, the virtual internal stacking port may eliminate the need for BPDU broadcasts by providing STP awareness over the multiple computer network devices in the stack. For example, the virtual internal stacking port may aggregate information (such as a protocol view of ports in the multiple computer network devices and mapping to the ports). This information may allow the distributed STP to converge on a spanning tree for the electronic device, even when there are a large number of ports. Consequently, the communication techniques may improve the performance of the electronic device and the user experience when using the electronic device.

In the discussion that follows, an access point and/or an electronic device (such as a recipient electronic device, which is sometimes referred to as a 'client') may communicate packets or frames in accordance with a wireless communication protocol, such as an Institute of Electrical and Electronics Engineers (IEEE) 802.11 standard (which is sometimes referred to as 'Wi-Fi,' from the Wi-Fi Alliance of Austin, Tex.), Bluetooth (from the Bluetooth Special Interest Group of Kirkland, Wash.), and/or another type of wireless interface. In the discussion that follows, Wi-Fi is used as an illustrative example. For example, an IEEE 802.11 standard may include one or more of: IEEE 802.11a, IEEE 802.11b, IEEE 802.11g, IEEE 802.11-2007, IEEE 802.11n, IEEE 802.11-2012, IEEE 802.11-2016, IEEE 802.11ac, IEEE 802.11ax, IEEE 802.11ba, IEEE 802.11be, or other present or future developed IEEE 802.11 technologies.

However, a wide variety of communication protocols (such as Long Term Evolution or LTE, another cellular-telephone communication protocol, etc.) may be used. The wireless communication may occur in one or more bands of frequencies, such as: a 900 MHz, a 2.4 GHz, a 5 GHz, 6 GHz, the Citizens Broadband Radio Spectrum or CBRS (e.g., a frequency band near 3.5 GHz), a band of frequencies used by LTE or another cellular-telephone communication protocol or a data communication protocol, and/or a 60 GHz frequency band. (Note that IEEE 802.11ad communication over a 60 GHz frequency band is sometimes referred to as 'WiGig.' In the present discussion, these embodiments also encompassed by 'Wi-Fi.') In some embodiments, communication between electronic devices may use multi-user transmission (such as orthogonal frequency division multiple access or OFDMA).

Moreover, the electronic device and/or the access point may communicate with one or more other access points and/or computers in a network using a wireless or a wired communication protocol, such as an IEEE 802.11 standard, an IEEE 802.3 standard (which is sometimes referred to as 'Ethernet') and/or another type of wired or wireless interface. In the discussion that follows, Ethernet is used as an illustrative example of communication between the electronic device and/or the access point and the one or more other access points and/or computers in the network.

FIG. 1 presents a block diagram illustrating an example of communication among one or more access points 110 and electronic devices 112 (such as a cellular telephone, and which are sometimes referred to as 'clients') in a WLAN 114 (which is used as an example of a network) in accordance with some embodiments. Access points 110 may communicate with each other in WLAN 114 using wireless and/or wired communication (such as by using Ethernet or a communication protocol that is compatible with Ethernet). Note that access points 110 may include a physical access point and/or a virtual access point that is implemented in software in an environment of an electronic device or a computer. In addition, at least some of access points 110 (such as access points 110-3 and 110-4) may communicate with electronic devices 112 using wireless communication.

The wired and/or wireless communication among access points 110 in WLAN 114 may occur via network 116 (such as an intra-net, a mesh network, point-to-point connections and/or the Internet) and may use a network communication protocol, such as Ethernet. For example, WLAN 114 may include an electronic device 106, such as a computer network device (e.g., a switch or a router). As described further below with reference to FIGS. 4-8, in some embodiments electronic device 106 may include a stack of multiple computer network devices (which are sometimes referred to as 'stacking units').

Furthermore, the wireless communication using Wi-Fi may involve: transmitting advertising frames on wireless channels, detecting one another by scanning wireless channels, establishing connections (for example, by transmitting association or attach requests), and/or transmitting and receiving packets or frames (which may include the association requests and/or additional information as payloads). In some embodiments, the wired and/or wireless communication among access points 110 also involves the use of dedicated connections, such as via a peer-to-peer (P2P) communication technique. Therefore, access points 110 may support wired communication outside of WLAN 114 (such as Ethernet) and wireless communication within WLAN 114 (such as Wi-Fi), and one or more of access points 110 may also support a wired communication protocol for communicating via network 118 with electronic devices (such as a computer 104 or a controller 108 of WLAN 114, which may be remoted located from WLAN 114).

Figure 9:
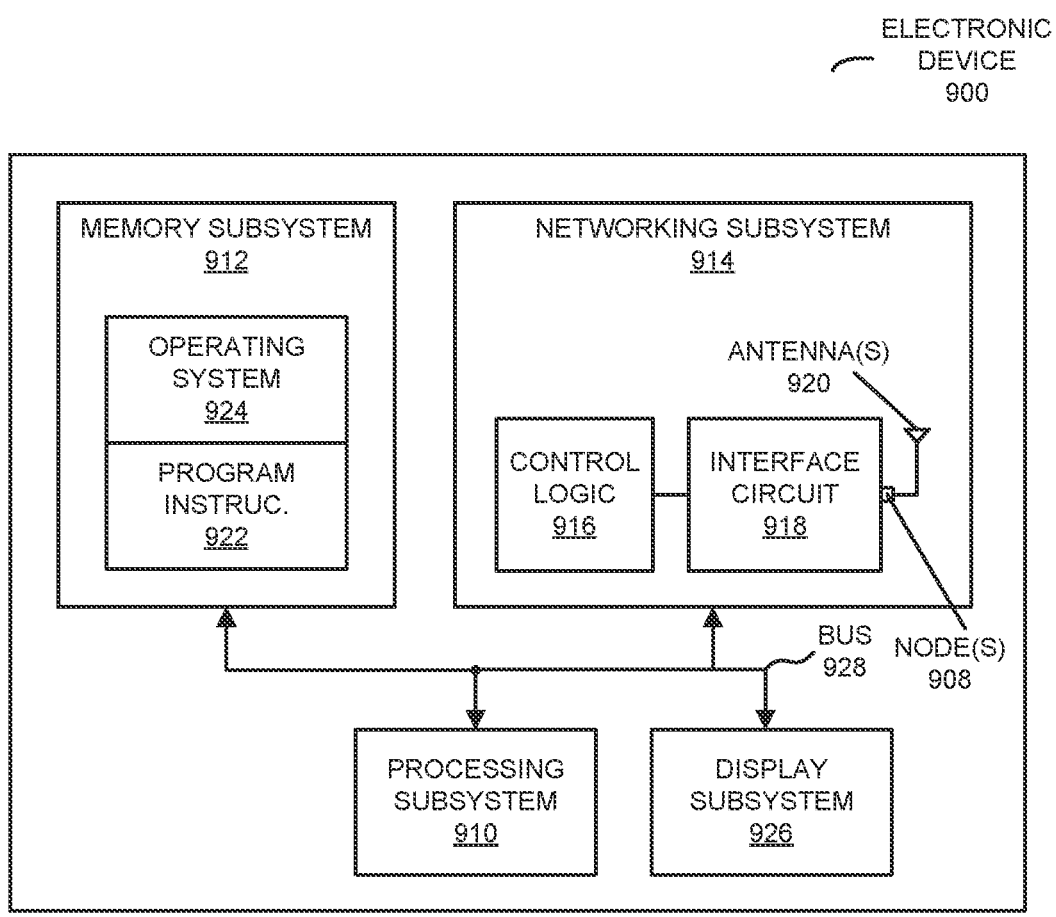
FIG. 9 is a block diagram illustrating an example of an electronic device in accordance with an embodiment of the present disclosure.

As described further below with reference to FIG. 9, electronic device 106, access points 110 and/or electronic devices 112 may include subsystems, such as a networking subsystem, a memory subsystem and a processor subsystem.

In addition, access points 110 and electronic devices 112 may include radios 120 in the networking subsystems. More generally, access points 110 and electronic devices 112 can include (or can be included within) any electronic devices with the networking subsystems that enable access points 110 and electronic devices 112 to communicate with each other using wireless and/or wired communication. This wireless communication can comprise transmitting advertisements on wireless channels to enable access points 110 and/or electronic devices 112 to make initial contact or detect each other, followed by exchanging subsequent data/management frames (such as association requests and responses) to establish a connection, configure security options (e.g., Internet Protocol Security), transmit and receive packets or frames via the connection, etc. Note that while instances of radios 120 are shown in access points 110 and electronic devices 112, one or more of these instances may be different from the other instances of radios 120.

As can be seen in FIG. 1, wireless signals 122 (represented by a jagged line) are transmitted from radio 120-4 in access point 110-4. These wireless signals may be received by radio 120-5 in electronic device 112-1. Notably, access point 110-4 may transmit packets or frames. In turn, these packets or frames may be received by electronic device 112-1. Moreover, access point 110-4 may allow electronic device 112-1 to communicate with other electronic devices, computers and/or servers via networks 116 and/or 118.

Note that the communication among access points 110 and/or with electronic devices 112 (and, more generally, communication among components in WLAN 114) may be characterized by a variety of performance metrics, such as: a received signal strength (RSSI), a data rate, a data rate for successful communication (which is sometimes referred to as a 'throughput'), an error rate (such as a retry or resend rate), a mean-square error of equalized signals relative to an equalization target, intersymbol interference, multipath interference, a signal-to-noise ratio, a width of an eye pattern, a ratio of number of bytes successfully communicated during a time interval (such as 1-10 s) to an estimated maximum number of bytes that can be communicated in the time interval (the latter of which is sometimes referred to as the 'capacity' of a communication channel or link), and/or a ratio of an actual data rate to an estimated data rate (which is sometimes referred to as 'utilization').

In the described embodiments processing a packet or frame in access points 110 and electronic devices 112 includes: receiving signals (such as wireless signals 122) corresponding to the packet or frame; decoding/extracting the packet or frame from received wireless signals 122 to acquire the packet or frame; and processing the packet or frame to determine information contained in the packet or frame.

Although we describe the network environment shown in FIG. 1 as an example, in alternative embodiments, different numbers or types of electronic devices may be present. For example, some embodiments comprise more or fewer electronic devices. As another example, in another embodiment, different electronic devices are transmitting and/or receiving packets or frames.

As noted previously, implementing an existing centralized or distributed STP in an electronic device (such as electronic device 106) that includes a large number of ports may result in: high processor usage, large internal traffic, long convergence times, and/or failures.

As described further below with reference to FIGS. 2-8, in order to address these problems, electronic device 106 may implement the disclosed distributed STP. By pushing the spanning tree burden to the multiple computer network devices in a stack in electronic device 106, an active unit in electronic device 106 is no longer a bottleneck. Moreover, by establishing virtual internal switching ports in the multiple computer network devices that are connected to a common virtual hub, a given computer network device in the stack may have STP awareness over the multiple computer network devices in the stack. This capability may allow the distributed STP to converge without or with reduced network broadcasts (such as BPDU broadcasts) in the stack.

Notably, the given computer network device in the stack in electronic device 106 may create or establish a virtual internal stacking port. This virtual internal stacking port may be included in the spanning tree and may provide stacking interface logic that allows the given computer network device to connect to the virtual hub in the stack that is common to the multiple computer network devices. Moreover, the given computer network device may run an instance of the distributed STP that controls ports in the given computer network device, where the instance of the distributed STP run by the given computer network device uses a bridge identifier that is common to the multiple computer network devices, and the distributed STP converges without or with reduced BPDU broadcasts among the multiple computer network devices.

As noted previously, the virtual internal stacking port may have STP awareness over the multiple computer network devices in the stack. For example, the virtual internal stacking port may aggregate information associated with the distributed STP over the multiple computer network devices in the stack. Notably, the information may include a protocol view of ports in the multiple computer network devices (such as forwarding or blocking) and mapping to the (hardware) ports. In some embodiments, the virtual internal stacking port may run a spanning tree state match to obtain the information for virtual internal stacking ports in the multiple computer network devices. Note that the spanning tree match may use control packets, such as packet data units (PDUs) in IPC messages.

Moreover, the spanning tree may be compatible with IEEE 802.1D and IEEE 802.1w. Furthermore, the virtual internal stacking port may have a protocol status of forwarding, but may be idle (e.g., incapable of forwarding packets). Notably, the virtual internal stacking port may not be mapped to a hardware (physical) port or resource. Note that the virtual internal stacking port may be implemented in software. In some embodiments, the virtual internal stacking port may be implemented using a virtual machine that is executed by one or more cores in one or more processors. In the present discussion, a virtual machine is an operating system or application environment that is implemented using software that imitates or emulates dedicated hardware or particular functionality of the dedicated hardware.

In this way, electronic device 106 may implement a spanning tree without a bottleneck, high internal traffic and/or failures. Therefore, the communication techniques implemented by electronic device 106 may scale to a large number of ports. Consequently, the communication techniques may improve the performance of electronic device 106 and, thus, the user experience when using electronic device 106.

Figure 2:
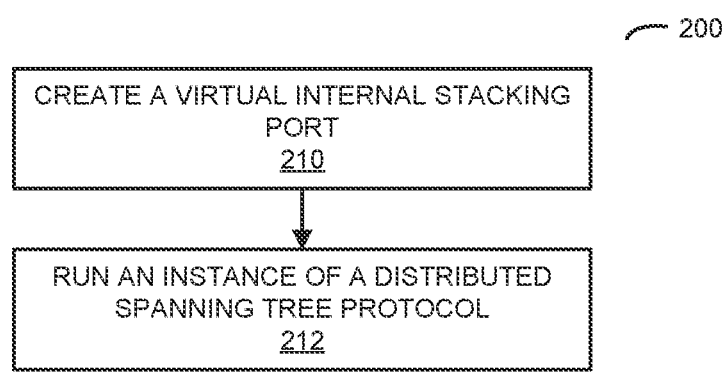
FIG. 2 is a flow diagram illustrating an example of a method for implementing a spanning tree using a distributed spanning tree protocol using a given computer network device in FIG. 1 in accordance with an embodiment of the present disclosure.

We now describe embodiments of a method. FIG. 2 presents a flow diagram illustrating an example of a method 200 for implementing a spanning tree using a distributed STP in accordance with some embodiments. This method may be performed by an electronic device (such as electronic device 106 in FIG. 1). This electronic device may include a stack with multiple computer network devices (such as switches or routers).

During operation, a given computer network device in the electronic device may create a virtual internal stacking port (operation 210). This virtual internal stacking port is included in the spanning tree and provides stacking interface logic that allows the given computer network device to connect to a virtual hub in the stack that is common to the multiple computer network devices.

Moreover, the given computer network device may run an instance of the distributed STP (operation 212) that controls ports in the given computer network device, where the instance of the distributed STP run by the given computer network device uses a bridge identifier that is common to the multiple computer network devices.

In some embodiments, the distributed STP converges without or with reduced BPDU broadcasts among the multiple computer network devices.

Note that the electronic device may provide a non-blocking broadcast domain within the multiple computer network devices. Additionally, the spanning tree may be compatible with IEEE 802.1D and IEEE 802.1w.

Moreover, the virtual internal stacking port may support STP port state machines. For example, the supported STP port state machines may include a transmit/receive state machine.

Furthermore, the virtual internal stacking port may have STP awareness over the multiple computer network devices in the stack. For example, the virtual internal stacking port may aggregate information associated with the distributed STP over the multiple computer network devices in the stack. Notably, the information may include a protocol view of ports in the multiple computer network devices (such as forwarding or blocking) and mapping to the (hardware) ports. In some embodiments, the virtual internal stacking port may run a spanning tree state match to obtain the information for virtual internal stacking ports in the multiple computer network devices. Note that the spanning tree match may use control packets, such as packet data units (PDUs) in IPC messages.

In some embodiments, the virtual internal stacking port may have a protocol status of forwarding, but may be idle (e.g., incapable of forwarding packets). Notably, the virtual internal stacking port may not be mapped to a hardware (physical) port or resource. Moreover, a largest port identifier in the given computer network device may represent the virtual internal stacking port.

In some embodiments of method 200, there may be additional or fewer operations. Furthermore, the order of the operations may be changed, and/or two or more operations may be combined into a single operation.

Figure 3:
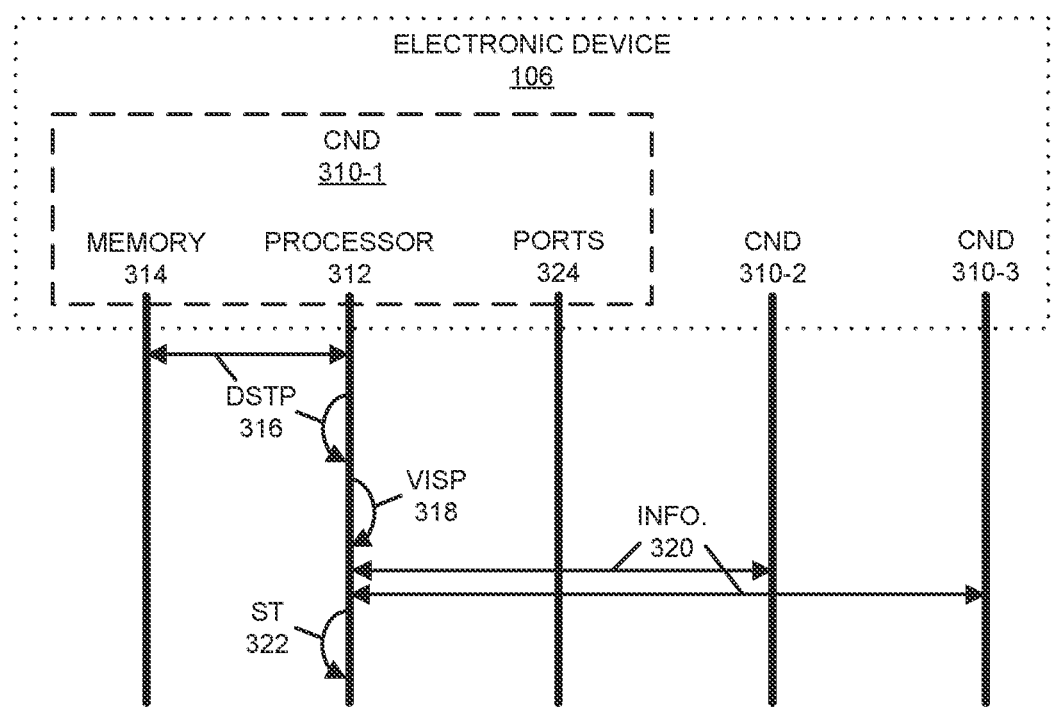
FIG. 3 is a drawing illustrating an example of communication among components in an electronic device in FIG. 1 in accordance with an embodiment of the present disclosure.

FIG. 3 presents a drawing illustrating an example of communication among components in electronic device 106 in accordance with some embodiments. This electronic device may include a stack with multiple computer network devices (CNDs) 310, such as switches or routers. Notably, a processor 312 in computer network device 310-1 may execute program instructions for a distributed STP (DSTP) 316 (which are stored in and accessed from memory 314 in computer network device 310-1) that implements a spanning tree (ST) 322. When executing an instance of the distributed STP 316, processor 312 may create a virtual internal stacking port (VISP) 318. This virtual internal stacking port is included in spanning tree 322 and provides stacking interface logic that allows computer network device 310-1 to connect to a virtual hub in the stack that is common to the computer network devices 310.

Note that the instance of the distributed STP 316 controls ports 324 in computer network device 310-1 and uses a bridge identifier that is common to computer network devices 310. While running the instance of the distributed STP 316, the virtual internal stacking port 318 may have STP awareness over computer network devices 310 in the stack, which allows computer network device 310-1 to get a self-consistent state of the stack and, thus, is used to determine spanning tree 322. For example, the virtual internal stacking port 318 may aggregate information 320 (such as a protocol view of ports in computer network devices 310 and mapping to the ports) associated with the distributed STP 316 over computer network devices 310 in the stack. Notably, the virtual internal stacking port 318 may run a spanning tree state match to obtain the information 320 for virtual internal stacking ports in computer network devices 310. Note that the spanning tree match may use control packets, such as PDUs in IPC messages that are communicated among the virtual internal stacking ports in computer network devices 310 via the virtual hub, to aggregate or obtain information 320. Furthermore, information 320 may allow the distributed STP 316 to converge on the spanning tree 322 without or with reduced BPDU broadcasts among the computer network devices 310.

While FIG. 3 illustrates communication between components using unidirectional or bidirectional communication with lines having single arrows or double arrows, in general the communication in a given operation in these figures may involve unidirectional or bidirectional communication.

In some embodiments, the communication techniques provide a de-centralized (per-virtual local area network or VLAN) IEEE 802.1D and IEEE 802.1w solution for determining a spanning tree in a stacking system that does not rely on BPDU broadcasts. In addition, the communication techniques may determine a hot-standby solution for the spanning tree.

Stacking systems (such as electronic device 106 in FIGS. 1 and 3) may include an enabled port number in one STP instance (per-VLAN or single span) that is large than 250. However, when a user enables more than 1,000 ports in a single STP instance, it may not be possible to support STP.

Many implementations of the STP are centralized. The STP typically needs to be able to access all of the ports. This usually means that the STP needs to: transmit BPDUs; receive BPDUs; know the link, speed and duplex of ports; set the STP state, and/or trigger MAC flush for the controlled ports.

Because of the centralized nature of the STP, it is often executed on one of the stacking units in a stack. However, it usually does not matter which stacking unit in the stack runs the STP for the whole stacking system. In order to make sure that this stacking unit has access of all ports in that stacking system, other stacking units will typically not process STP BPDUs. Instead, the other stacking units may relay the BPDUs to the stacking unit for processing. Moreover, the STP state setting and triggering of MAC flush is usually handled with an IPC message from the stacking unit. Note that the stacking unit that performs these operations is sometimes referred to as an 'active unit' for the STP.

Furthermore, the stacking unit typically has an 'active unit' role from the system view or perspective. For example, the active unit may handle command line interface (CLI) messages and/or may centralize remote port information to a centralized view. Therefore, the active unit for STP is usually the same unit as the active unit from the system view.

Because STP is usually run at the active unit of a stacking system, this active unit often performs all of the processing in the STP, and the other stacking units do not have much load and may be kept idle.

Figure 4:
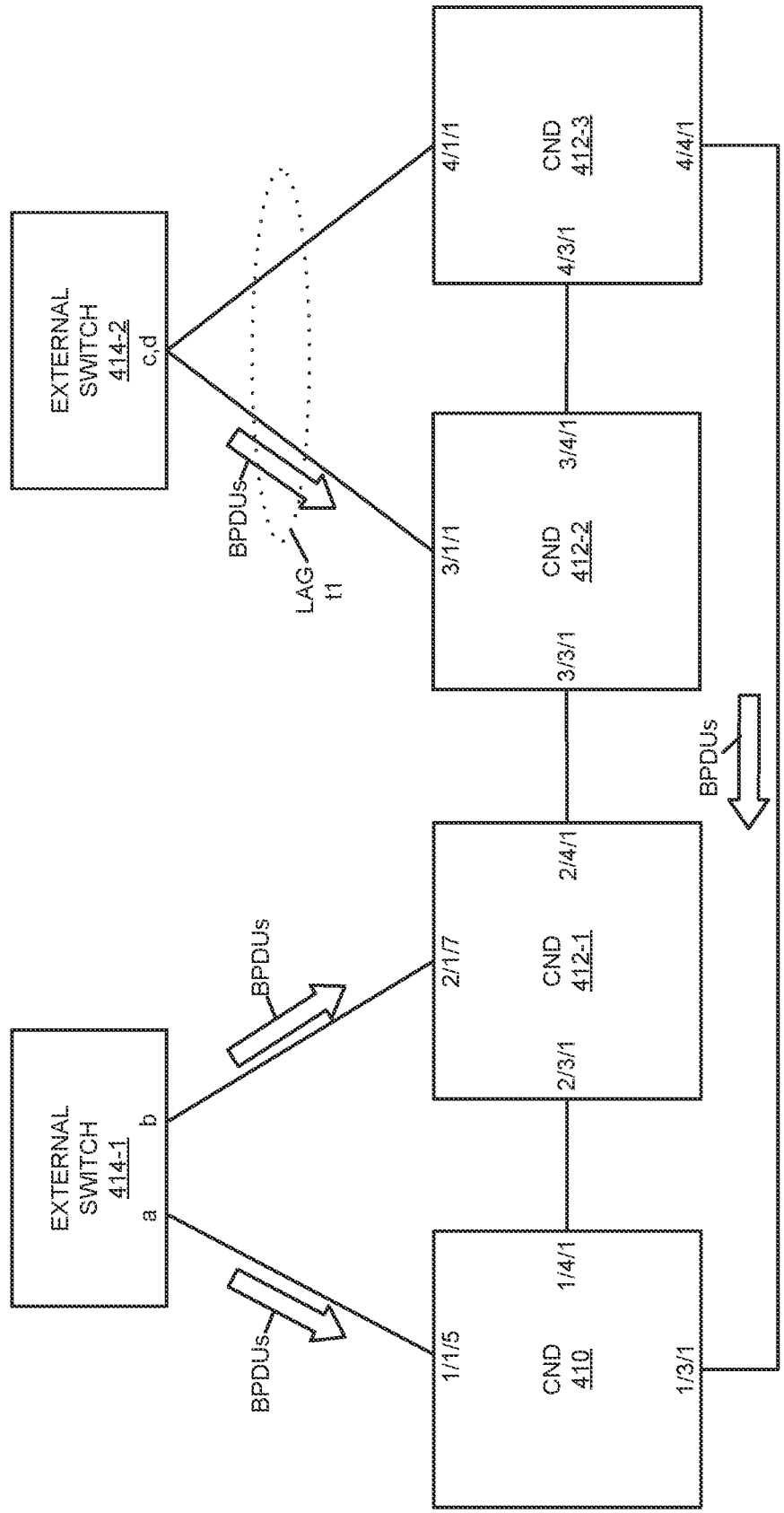
FIG. 4 is a drawing illustrating a stacking system in accordance with an embodiment of the present disclosure.

This is illustrated in FIG. 4, which presents a drawing illustrating a stacking system in accordance with an embodiment of the present disclosure. This system may include: active unit (computer network device 410), other stacking units 412, external switches 414, and links between external switch 414-2 and other stacking units 412-2 and 412-3 may be aggregated into a link aggregation group (LAG) t1. Moreover, in a typical centralized implementation, the active unit may process all BPDUs received from the other stacking units 412, such as BPDUs from stacking port 2/1/7, LAG t1, and other stacking units 412 that are received through IPC. Furthermore, the active unit may be responsible for all stacking ports, STP state setting and triggering system-wide MAC flush associated with the STP. Consequently, the other stacking units 412 may not process any BPDUs, set any stacking port STP state, or trigger any system-level MAC flush associated with the STP.

In the present disclosure, the communication techniques provide a de-centralized or distributed STP that does not rely on BPDU broadcasts or broadcasting. Notably, in order to help to reduce the heavy load put on active unit, a de-centralized STP may be used. In a stacking system with N external ports, in order to run the STP at the active unit, the STP is N-based. If a de-centralized STP is run on each of the stacking units, and assuming that the maximum port number for every stacking unit is M, then the STP complexity can be reduced to M-based. In the process, the load of the active unit is reduced and the idle processors on the other stacking units can be used.

However, if the STP is simply run on every stacking unit for its own or local ports, the resulting solutions will not work. Notably, customers expect that the whole stack behaves as a single switch. If a given stacking unit cannot get information about the external ports of the other stacking units, the STP will not converge.

Figure 5:
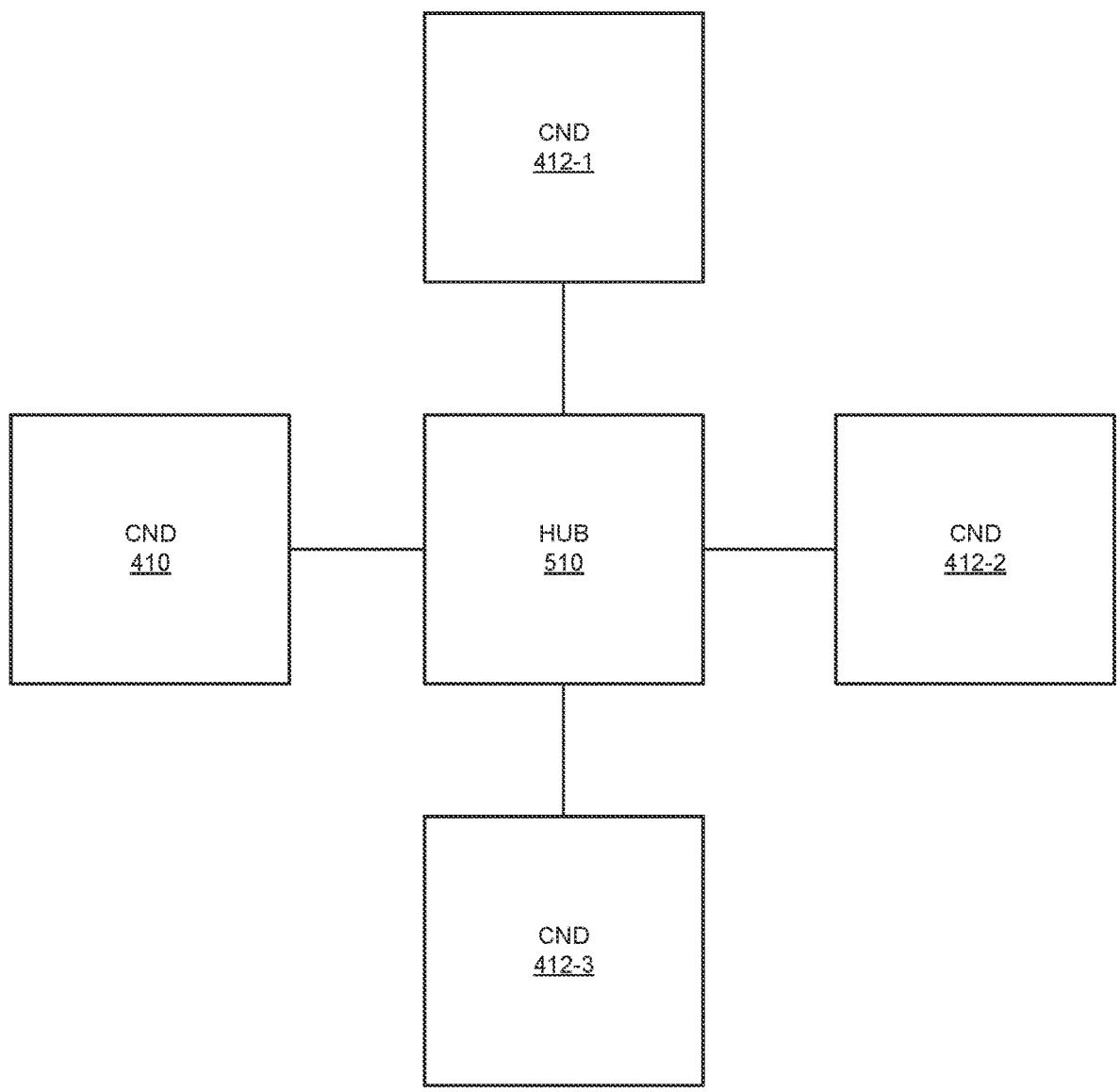
FIG. 5 is a drawing illustrating a stacking system that includes multiple computer network devices in accordance with an embodiment of the present disclosure.
Figure 6:
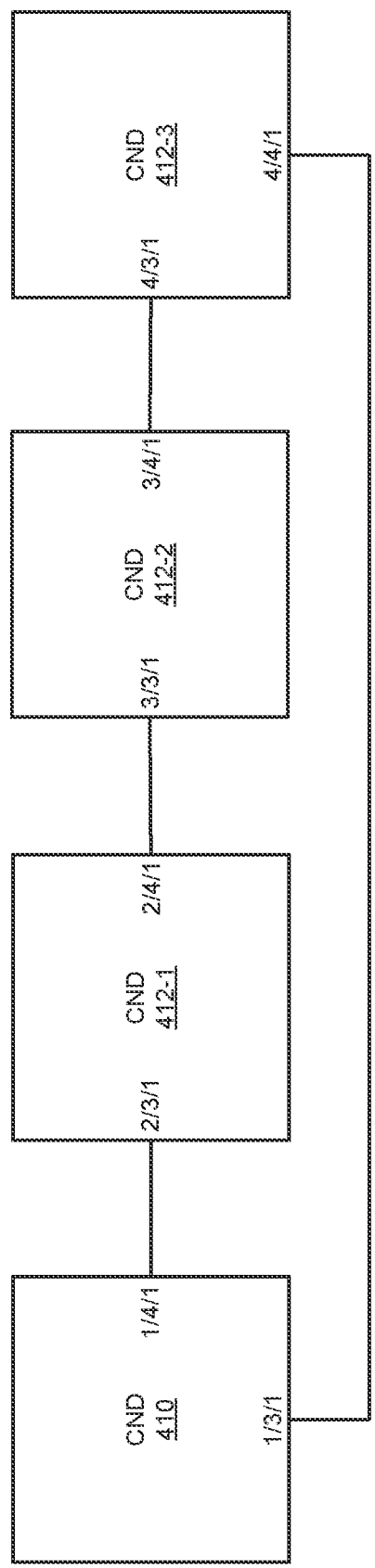
FIG. 6 is a drawing illustrating a stacking system that includes multiple computer network devices in accordance with an embodiment of the present disclosure.

In the disclosed communication techniques, the distributed STP leverages the fact that a port can be connected to a hub that connects multiple STP-running switches, so that the stacking system can converge naturally according to the standards. This is shown in FIG. 5, which presents a drawing illustrating a stacking system with multiple computer network devices 410 and 412 in accordance with an embodiment of the present disclosure. Notably, computer network devices 410 and 412 may be connected to a hub 510. For a given computer network device, the port that connects with hub 510 may receive the BPDUs from the other computer network devices, so that a distributed STP can converge according to standards, such as IEEE 802.1D and IEEE 802.1w. This indicates that a distributed STP may be implemented if we run STP locally in each of computer network devices 410 and 412 (with the same bridge identifier, so that they are the same bridge implementing a distributed solution instead of independent bridges) for local ports and broadcast the BPDUs received by the other computer network devices to a local stacking port. (Note that the use of the same bridge identifier may help break a local loop that can occur between stacking ports in the same stack.) This approach is illustrated in FIG. 6, which presents a drawing illustrating a stacking system that includes multiple computer network devices 410 and 412 in accordance with an embodiment of the present disclosure.

Note that broadcasting the BPDUs received by the other computer network devices to a local stacking port may require stacking port forwarding. However, in some stacking systems, stacking port forwarding may be based upon a HiGig header (from Broadcom, Inc., of San Jose, Calif.), and it may be difficult to send, e.g., a PDU from stacking port 1/3/1 in computer network device 410 to stacking port 2/4/1 in other stacking unit 412-1. (More generally, a stacking port may not have an Ethernet interface, and transmitting/receiving packets to/from the stacking port and expecting it to be behave like an Ethernet port that runs STP may not be easy to implement.) Moreover, the BPDU, even when put into a HiGig header, may reach other stacking unit 412-1 by stacking port 2/3/1 from another direction (in a ring topology) instead of stacking port 2/4/1 (which is a logical block in stack ring).

However, it is not necessary for stacking port 2/3/1 on the left side of other stacking unit 412-1 or stacking port 2/4/1 on the right side of other stacking unit 412-1 to receive this PDU. Instead, the stacking ports, switch port extender (SPX) cascade and uplink logic overall may be viewed a logical stacking interface that provides connectivity for this stacking unit to access the rest of the stack. Consequently, instead of actually transmitting/receiving PDUs to/from all stacking ports/trunks, each of the stacking units may broadcast or communicate information to this logical stack interface (e.g., using IPC messages) even if there is another active switching port in the local (distributed) STP instance (e.g., via a local enable portmask).

Figure 7:
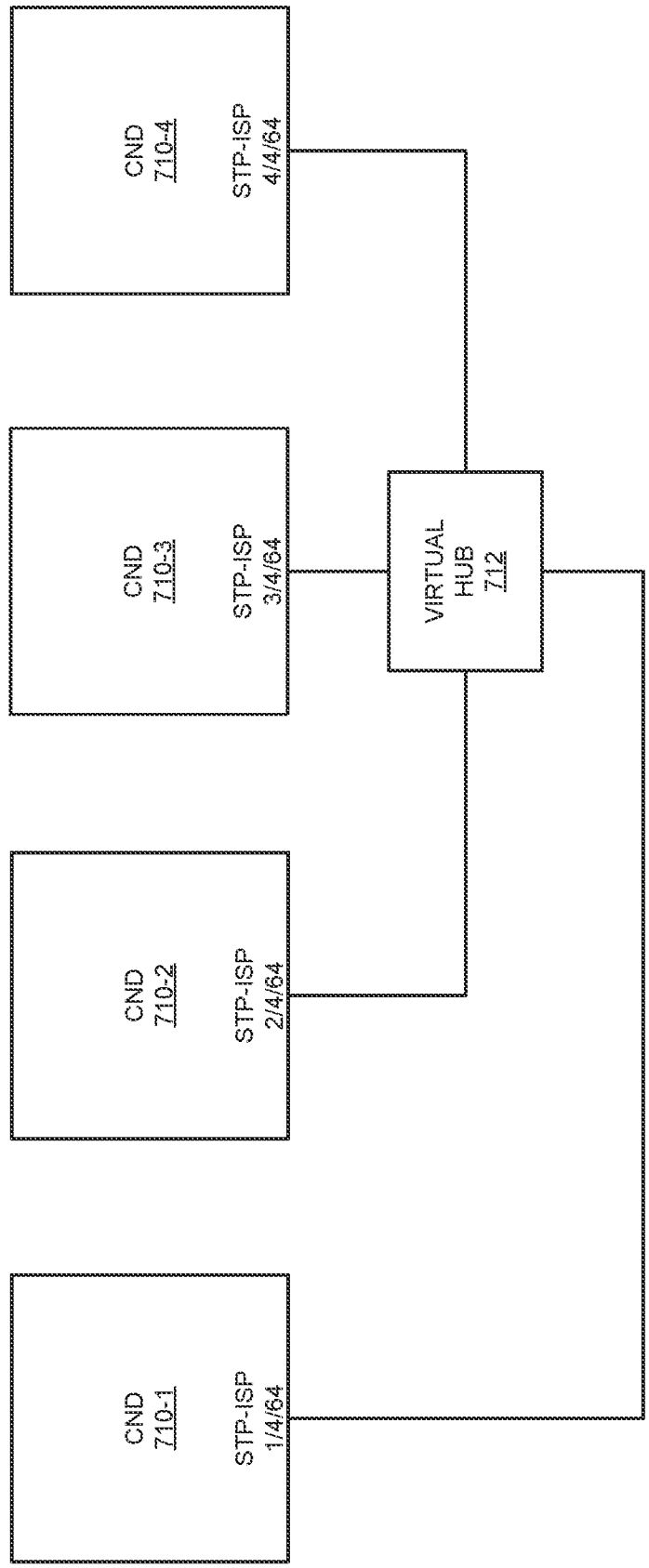
FIG. 7 is a drawing illustrating a stacking system that includes multiple computer network devices in accordance with an embodiment of the present disclosure.

This is shown in FIG. 7, which presents a drawing illustrating a stacking system that includes multiple computer network devices 710 in accordance with an embodiment of the present disclosure. Notably, computer network devices 710 may implement a distributed STP in embodiments of the communication technique. This distributed STP solution may be compatible with IEEE 802.1D and IEEE 802.1w by virtualizing the stacking logic as a virtual hub and virtualizing the whole stacking interface as an internal stacking port or ISP (which is sometimes referred to as a 'virtual internal stacking port' or an 'STP-ISP'). This STP-ISP may only be used by the distributed STP technique and may be a 'virtual port' because it is not mapped to any physical present hardware. Each of computer network devices 710 may have one STP-ISP. From the point of view of the distributed STP, all the computer network devices 710 (or stacking units) are connected by their STP-ISPs to virtual hub 712. The virtual hub may provide the stacking logic. It may be a broadcast domain that guarantees connectivity and no loops in it.

Note that in some embodiments a management port/stacking port may be re-used as the ISP. However, this may be difficult. For example, there could be two stacking interfaces in every stacking unit, which may include a stacking port/stack trunk. This may require a detail and complicated implementation of stacking in the STP data structure.

In the distributed STP technique, STP-ISP may be a member of every and any locally distributed STP instance and may always be an enabled port. However, the path cost of the STP-ISP may always be zero in order to ensure that, if the distributed STP decides to block a stacking port, it may never be the STP-ISP. Consequently, the STP-ISP may be either a DESIGNATED role or a ROOT role. In some embodiments, the largest port identifier for a local port may be the port identifier of the STP-ISP. Thus, for stacking unit X, the STP-ISP may be X/4/64. For example, for stacking unit 1 the STP-ISP may be 1/4/64, and for stacking unit 2 the STP-ISP may be 2/4/64.

As an illustration, in some embodiments a VLAN 200 may include: tagged Ethernet 1/1/17 Ethernet 2/1/7 Ethernet 2/1/9 Ethernet 2/1/11. In the distributed STP with STP-ISP support: stacking unit 710-1 may start the distributed STP (or an instance of the distributed STP) with stacking port 1/1/17, and its STP-ISP may be 1/4/64; and stacking unit 710-2 may also start an instance of the distributed STP for VLAN 200 with stacking ports 2/1/7, 2/1/9 and 2/1/11, and its STP-ISP may be 2/4/64. Moreover, stacking units without an external port controlled by the distributed STP, such as stacking units 710-3 and 710-4, may start the instance of the distributed STP with STP-ISPs of 3/4/64 and 4/4/64, respectively.

Note that the STP-ISP may behave almost like a regular STP port, which runs all normal STP port state machines, including the transmit/receive state machine. However, because the STP-ISP is not a real port, transmission of a BPDU out of the STP-ISP may be implemented using an IPC message sent to the rest of the stacking unit(s). When the rest of the stacking unit(s) receive this IPC message, the distributed STP technique may use the receive state machine process of a regular STP, as if the BPDU was really received from the STP-ISP. Consequently, the receive state machines may not have to change for the STP-ISP. Note that the transmit state machine on the STP-ISP may only control the transmit timing. As described further below, the configuration/rapid spanning tree (RST) BPDU sent out of the STP-ISP may not be the locally generated BPDU by that instance of the distributed STP, but a specific BPDU called an ISP-BPDU.

Moreover, as noted previously, a path cost for the STP-ISP may always be zero, so it may never enter a non-DESIGNATED/alternative/backup role and may always be forwarding. Consequently, the STP-ISP may not trigger a topology change.

When the transmit state machine of the STP-ISP needs to send a configuration/RST BPDU (for example, the STP-ISP is a DESIGNATED port for an instance of the distributed STP), it may send out the ISP-BPDU instead of the BPDU generated by distributed STP protocol for the STP-ISP. This BPDU sent to the STP-ISP may be sent to all the stacking units and may be processed by the instances of the distributed STP in these stacking units as if the BPDU is actually received from the their local STP-ISP.

The ISP-BPDU may be per-instance of the distributed STP, per-unit object. Note that, in case the STP/RST instance on local stacking unit is holding the ROOT bridge role, there may not be an ISP BPDU for that stacking unit. In some embodiments, there may be multiple instances of the distributed STP are running on a stacking unit. For example, VLAN 200 and VLAN 300 running per-VLAN spanning tree (PVST) IEEE 802.1D (PVST STP) and VLAN 100 and 500 running PVST IEEE 802.1w (PVST RSTP). If VLAN 500 in the local stacking unit is the ROOT bridge, there may be three ISP-BPDUs, respectively for VLAN 100, VLAN 200 and VLAN 300.

Moreover, the ISP-BPDU may refer to the best BPDU (or best vector PDU) a local instance of the distributed STP in a stacking unit received from its local external (user) ports. It may be a configuration BPDU when running a distributed STP that is compatible with IEEE 802.1D and an RST BPDU when running a distributed STP that is compatible with IEEE 802.1w.

For example, the ROOT port for a stacking unit may be port 1/1/1. This stacking unit may receive the best BPDU from this port. Instead of letting the STP-ISP of the stacking unit send its own BPDU (with the local bridge identifier and the port identifier of 1/4/64), which does not help the distributed STP converge, the distributed STP technique may put information from the BPDU received from port 1/1/1 into a BPDU that the STP-ISP of the stacking unit needs to send (which is the ISP-BPDU). When other units receive this BPDU from their STP-ISPs, they get information similar to the information from port 1/1/1, so their STP-ISPs can be a ROOT port and stop sending.

In another example, STP-ISP 2/4/64 on a stacking unit may process the BPDU sent by STP-ISP 1/4/64 on another stacking unit (i.e., the ISP-BPDU of the other stacking unit). This BPDU may include information for the actual ROOT bridge and STP-ISP 2/4/64 may process the BPDU as if it were directly received from port 1/1/1. In this way, information from another stacking unit is provided to the STP-ISP of the local stacking unit and the distributed STP technique may converge.

In a stable environment, a stacking system that runs a distributed STP that is not a root bridge for the stacking system may have a ROOT port on one of the stacking units and the STP-ISP for that stacking unit will be a DESIGNATED port and the STP-ISPs for the remainder of the stacking units may be a ROOT port. Note that, if the stacking system is the ROOT bridge of the L2 network, there may not be a BPDU transmitted to the STP-ISP ports of any of the stacking units.

A copy of the ISP-BPDU for each local instance of the distributed STP may be saved. The ISP-BPDU may age out if the BPDU containing the same information stops coming to the stacking unit (e.g., stacking port 1/1/1 stops receiving the superior BPDU), and it can be updated before aging out if there is superior information received by the local stacking unit. The local instance of the distributed STP may update the message age of the ISP-BPDU by its own timer and the age of the ISP-BPDU may also be updated when a repeated/new best BPDU is received by the local stacking unit.

By using the STP-ISP as a regular STP port and the ISP-BPDU, the communication techniques may reduce the broadcasts and may simplify the logic for the distributed STP. This logic may include: run instances of the distributed STP on every stacking unit for their local ports and the STP-ISP; keep a copy of the ISP-BPDU; and when the distributed STP technique tries to send a configuration/RST BPDU to its STP-ISP, send the ISP-BPDU instead.

In some embodiments, the distributed STP may be used to handle a LAG. Link aggregation allows multiple physical Ethernet links to be bundled to form a single logical trunk that provides enhanced performance and redundancy. The aggregated trunk is referred to as a LAG. The LAG may be viewed as a single logical link by connected devices, the STP, IEEE 802.1Q VLANs, and so on. When one physical link in the LAG fails, the other links stay up. However, a small drop in traffic is experienced when the link carrying the traffic fails.

A LAG may include several ports residing on a different stacking unit, however there can be only one LAG object being controlled by the STP regardless or whether it is centralized or distributed. For example, LAG t1 in FIG. 4 includes stacking port 3/1/1 on switching unit 412-2 and stacking port 4/1/1 on stacking unit 412-3. Moreover, a distributed STP is being executed by the stacking units 410 and 412. Either the instance of the distributed STP in stacking unit 412-2 or the instance of the distributed STP in stacking unit 412-3 may control LAG t1. However, because of the centralized nature of the LAG feature, the LAG interface itself may be managed by the active unit (stacking unit 410). Therefore, it may be natural to have the active unit control all LAG interface regardless of whether or not there is member port in a LAG on the active unit.

Moreover, the distributed STP may handle hot standby, e.g., in the LAG. Notably, a stacking unit may be selected as a standby unit for the distributed STP. This stacking unit may take over the active role when the previous active unit crashes.

When the active unit crashes, operation of the instance of the distributed STP in a given member stacking unit may not be affected. It may relay the BPDUs to the new active unit and may receive IPC messages from the new active unit, such as a BPDU transmit on the LAG and for the STP state setting for the LAG.

Consequently, when the active unit crashes, the standby unit may not have much to do. Notably, when the active unit crashes, the standby unit may take over the previous active role. In addition to maintaining the local port, the standby unit may transmit a BPDU for the LAG, process the BPDU from the LAG, and start to set the STP state for the LAG. However, if the standby unit just re-initialize for all the LAG interfaces, there could be a traffic disturbance (e.g., for 30 s) and possibly a large topology change for the whole L2 system. In order to avoid such a traffic disturbance and topology change, a hot standby design may be used. Notably, the standby unit may run the distributed STP, not only with the local physical port, but all the LAG interfaces. Moreover, the standby unit may maintain an independent LAG library from the active unit, so that, when active crashes, the standby unit does not need to re-initialize the LAG library. Furthermore, by processing the BPDUs coming from the LAG and maintaining its LAG library, the role of the standby unit in the distributed STP and the status for the LAG interface in its instance of the distributed STP may converge with the active unit.

Figure 8:
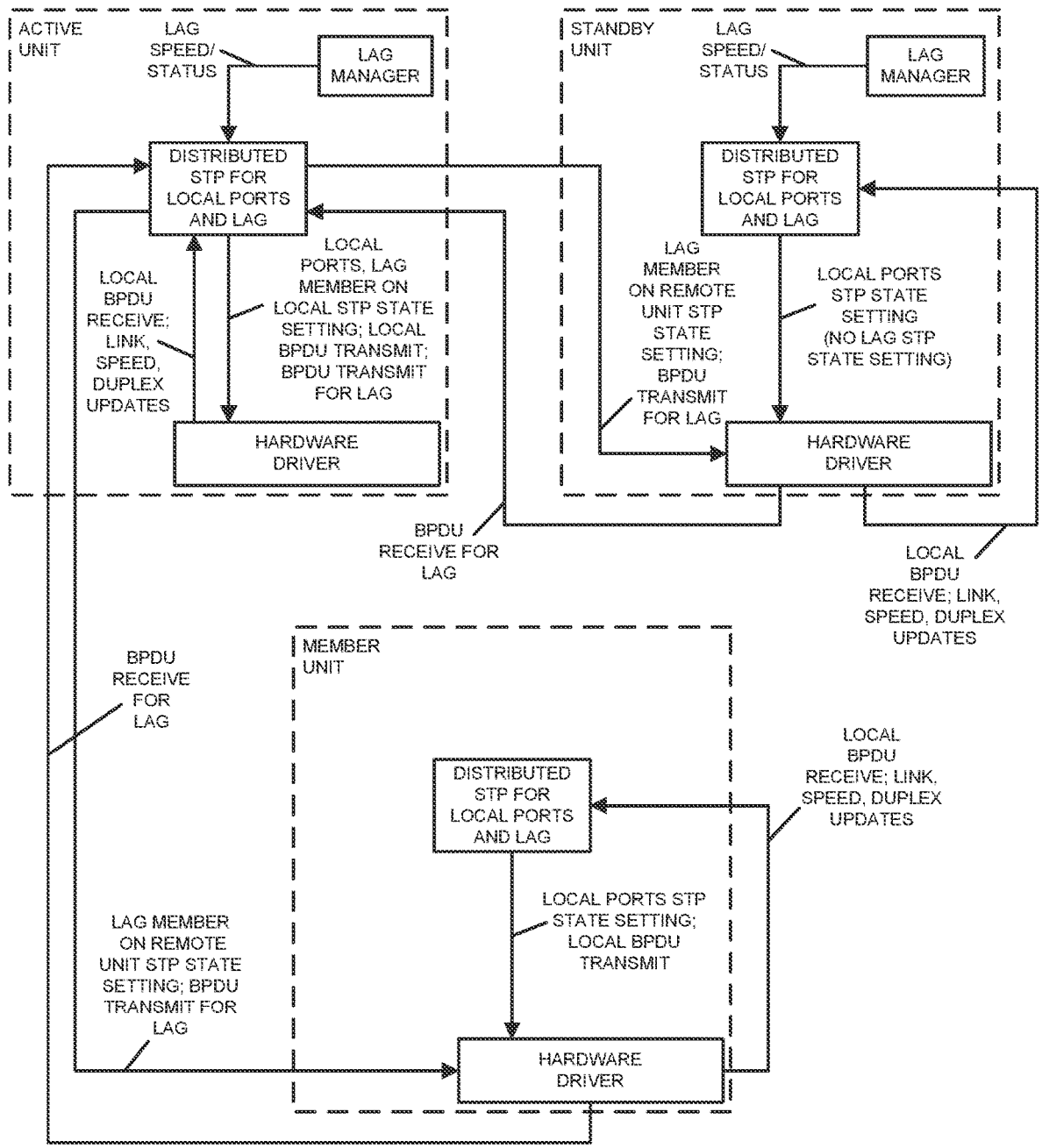
FIG. 8 is a drawing illustrating a stacking system that includes multiple computer network devices in accordance with an embodiment of the present disclosure.

However, a timing difference may cause the active unit and the standby unit to have different views for their LAG interface in the distributed STP. In order to correct or eliminate this difference, when the standby unit becomes the active unit, it may use the status of the LAG interface in the instance of the distributed STP for the standby unit to re-write the hardware of the stacking system. When a stacking unit receives the re-write operation request from new active unit, it may compare the new value with its current value in order to avoid a traffic disturbance caused by the re-write. The hot standby technique for the distributed STP is shown in FIG. 8, which presents a drawing illustrating a stacking system that includes multiple computer network devices in accordance with an embodiment of the present disclosure.

In some embodiments, the distributed STP handles a topology change process. In IEEE 802.1D, a topology change is defined: when a port that was forwarding is going down (e.g., blocking); or when a port transitions to forwarding and the bridge has a DESIGNATED port (which means that the bridge is not standalone). Note that a topology change describes a process, while a topology change BPDU is an IEEE configuration BPDU with a topology change bit being set.

In order to support the distributed STP technique, there may be a modification of the topological change from the standard (such as IEEE 802.1D). In a first case, assume that the local stacking unit is an STP ROOT bridge running a distributed STP, and it detects a topology change from one of its external ports. In response, it may start the topology change timer and send topology change BPDU (a configuration BPDU with the topology change bit), because it is a ROOT bridge. The configuration BPDU may not be sent to the STP-ISP. Consequently, in this embodiment, the distributed STP will work without a change to the IEEE standard.

In a second case, assume the local stacking unit running the distributed STP detects a topology change and it is not an STP ROOT bridge. If the topology change happens at a stacking unit X that has the STP-ISP as a ROOT port, the stacking unit may start a topology change notification (TCN) process, and may send the TCN to its ROOT port, which is the STP-ISP. Other stacking units that also have their STP-ISPs as the root port do not respond to this TCN. The stacking unit that has its STP-ISP as a DESIGNATED port Y (there typically is one external port as a root port) may respond to this STP-ISP TCN with an STP-ISP topology change acknowledgment or TCA (which is a configuration PDU with the TCA bit send by the STP-ISP), and may trigger local TCN process. The change here is that the STP-ISP TCN PDU, and the processing of the STP-ISP TCN-PDU, may be different by a stacking unit that has the STP-ISP as a ROOT or a DESIGNATED role. Note that the other stacking units in the stack are not in a TCN process, so they do not care about the TCA. Moreover, the stacking unit X may process the STP-ISP TCA and stop its TCN process.

Alternatively, the topology change may occur at a stacking unit Y that has an external port as a ROOT port. This stacking unit may start the TCN process, and send the TCN to its ROOT port. An upstream computer network device (such as a switch) may send a TCA to suppress the TCN. Moreover, other stacking units in the stack may not be involved in this TCN process.

We now describe embodiments of an electronic device, which may perform at least some of the operations in the communication techniques. FIG. 9 presents a block diagram illustrating an example of an electronic device 900 in accordance with some embodiments, such as one of computer 104, electronic device 106, controller 108, one of access points 110 or one of electronic devices 112. This electronic device includes processing subsystem 910, memory subsystem 912, and networking subsystem 914. Processing subsystem 910 includes one or more devices configured to perform computational operations. For example, processing subsystem 910 can include one or more microprocessors, ASICs, microcontrollers, programmable-logic devices, one or more graphics process units (GPUs) and/or one or more digital signal processors (DSPs).

Memory subsystem 912 includes one or more devices for storing data and/or instructions for processing subsystem 910 and networking subsystem 914. For example, memory subsystem 912 can include dynamic random access memory (DRAM), static random access memory (SRAM), and/or other types of memory. In some embodiments, instructions for processing subsystem 910 in memory subsystem 912 include: one or more program modules or sets of instructions (such as program instructions 922 or operating system 924), which may be executed by processing subsystem 910. Note that the one or more computer programs may constitute a computer-program mechanism. Moreover, instructions in the various modules in memory subsystem 912 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 910.

In addition, memory subsystem 912 can include mechanisms for controlling access to the memory. In some embodiments, memory subsystem 912 includes a memory hierarchy that comprises one or more caches coupled to a memory in electronic device 900. In some of these embodiments, one or more of the caches is located in processing subsystem 910.

In some embodiments, memory subsystem 912 is coupled to one or more high-capacity mass-storage devices (not shown). For example, memory subsystem 912 can be coupled to a magnetic or optical drive, a solid-state drive, or another type of mass-storage device. In these embodiments, memory subsystem 912 can be used by electronic device 900 as fast-access storage for often-used data, while the mass-storage device is used to store less frequently used data.

Networking subsystem 914 includes one or more devices configured to couple to and communicate on a wired and/or wireless network (i.e., to perform network operations), including: control logic 916, an interface circuit 918 and one or more antennas 920 (or antenna elements). (While FIG. 9 includes one or more antennas 920, in some embodiments electronic device 900 includes one or more nodes, such as nodes 908, e.g., a network node that can be coupled or connected to a network or link, or an antenna node, connector or a metal pad that can be coupled to the one or more antennas 920. Thus, electronic device 900 may or may not include the one or more antennas 920.) For example, networking subsystem 914 can include a Bluetooth™ networking system, a cellular networking system (e.g., a 3G/4G/5G network such as UMTS, LTE, etc.), a universal serial bus (USB) networking system, a networking system based on the standards described in IEEE 802.11 (e.g., a Wi-Fi® networking system), an Ethernet networking system, a cable modem networking system, and/or another networking system.

Note that a transmit or receive antenna pattern (or antenna radiation pattern) of electronic device 900 may be adapted or changed using pattern shapers (such as reflectors) in one or more antennas 920 (or antenna elements), which can be independently and selectively electrically coupled to ground to steer the transmit antenna pattern in different directions. Thus, if one or more antennas 920 include N antenna pattern shapers, the one or more antennas may have $2^N$ different antenna pattern configurations. More generally, a given antenna pattern may include amplitudes and/or phases of signals that specify a direction of the main or primary lobe of the given antenna pattern, as well as so-called 'exclusion regions' or 'exclusion zones' (which are sometimes referred to as 'notches' or 'nulls'). Note that an exclusion zone of the given antenna pattern includes a low-intensity region of the given antenna pattern. While the intensity is not necessarily zero in the exclusion zone, it may be below a threshold, such as 3 dB or lower than the peak gain of the given antenna pattern. Thus, the given antenna pattern may include a local maximum (e.g., a primary beam) that directs gain in the direction of electronic device 900 that is of interest, and one or more local minima that reduce gain in the direction of other electronic devices that are not of interest. In this way, the given antenna pattern may be selected so that communication that is undesirable (such as with the other electronic devices) is avoided to reduce or eliminate adverse effects, such as interference or crosstalk.

Networking subsystem 914 includes processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. Moreover, in some embodiments a 'network' or a 'connection' between the electronic devices does not yet exist. Therefore, electronic device 900 may use the mechanisms in networking subsystem 914 for performing simple wireless communication between the electronic devices, e.g., transmitting advertising or beacon frames and/or scanning for advertising frames transmitted by other electronic devices as described previously.

Within electronic device 900, processing subsystem 910, memory subsystem 912, and networking subsystem 914 are coupled together using bus 928. Bus 928 may include an electrical, optical, and/or electro-optical connection that the subsystems can use to communicate commands and data among one another. Although only one bus 928 is shown for clarity, different embodiments can include a different number or configuration of electrical, optical, and/or electro-optical connections among the subsystems.

In some embodiments, electronic device 900 includes a display subsystem 926 for displaying information on a display, which may include a display driver and the display, such as a liquid-crystal display, a multi-touch touchscreen, etc.

Electronic device 900 can be (or can be included in) any electronic device with at least one network interface. For example, electronic device 900 can be (or can be included in): a desktop computer, a laptop computer, a subnotebook/netbook, a server, a tablet computer, a smartphone, a cellular telephone, a smartwatch, a consumer-electronic device, a portable computing device, an access point, a transceiver, a router, a switch, communication equipment, a computer network device, a stack of multiple computer network devices, a controller, test equipment, an Internet-of-Things (IoT) device, and/or another electronic device.

Although specific components are used to describe electronic device 900, in alternative embodiments, different components and/or subsystems may be present in electronic device 900. For example, electronic device 900 may include one or more additional processing subsystems, memory subsystems, networking subsystems, and/or display subsystems. Additionally, one or more of the subsystems may not be present in electronic device 900. Moreover, in some embodiments, electronic device 900 may include one or more additional subsystems that are not shown in FIG. 9. Also, although separate subsystems are shown in FIG. 9, in some embodiments some or all of a given subsystem or component can be integrated into one or more of the other subsystems or component(s) in electronic device 900. For example, in some embodiments program instructions 922 are included in operating system 924 and/or control logic 916 is included in interface circuit 918. In some embodiments, the communication techniques are implemented using information in L2 of the OSI model.

Moreover, the circuits and components in electronic device 900 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit (which is sometimes referred to as a 'communication circuit') may implement some or all of the functionality of electronic device 900 and/or networking subsystem 914. The integrated circuit may include hardware and/or software mechanisms that are used for transmitting wireless signals from electronic device 900 and receiving signals at electronic device 900 from other electronic devices. Aside from the mechanisms herein described, radios are generally known in the art and hence are not described in detail. In general, networking subsystem 914 and/or the integrated circuit can include any number of radios. Note that the radios in multiple-radio embodiments function in a similar way to the described single-radio embodiments.

In some embodiments, networking subsystem 914 and/or the integrated circuit include a configuration mechanism (such as one or more hardware and/or software mechanisms) that configures the radio(s) to transmit and/or receive on a given communication channel (e.g., a given carrier frequency). For example, in some embodiments, the configuration mechanism can be used to switch the radio from monitoring and/or transmitting on a given communication channel to monitoring and/or transmitting on a different communication channel. (Note that 'monitoring' as used herein comprises receiving signals from other electronic devices and possibly performing one or more processing operations on the received signals)

In some embodiments, an output of a process for designing the integrated circuit, or a portion of the integrated circuit, which includes one or more of the circuits described herein may be a computer-readable medium such as, for example, a magnetic tape or an optical or magnetic disk. The computer-readable medium may be encoded with data structures or other information describing circuitry that may be physically instantiated as the integrated circuit or the portion of the integrated circuit. Although various formats may be used for such encoding, these data structures are commonly written in: Caltech Intermediate Format (CIF), Calma GDS II Stream Format (GDSII) or Electronic Design Interchange Format (EDIF). Those of skill in the art of integrated circuit design can develop such data structures from schematics of the type detailed above and the corresponding descriptions and encode the data structures on the computer-readable medium. Those of skill in the art of integrated circuit fabrication can use such encoded data to fabricate integrated circuits that include one or more of the circuits described herein.

While the preceding discussion used Ethernet and a Wi-Fi communication protocol as an illustrative example, in other embodiments a wide variety of communication protocols and, more generally, wired and/or wireless communication techniques may be used. Thus, the communication techniques may be used with a variety of network interfaces. Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the communication techniques may be implemented using program instructions 922, operating system 924 (such as a driver for interface circuit 918) or in firmware in interface circuit 918. Alternatively or additionally, at least some of the operations in the communication techniques may be implemented in a physical layer, such as hardware in interface circuit 918.

In the preceding description, we refer to 'some embodiments.' Note that 'some embodiments' describes a subset of all of the possible embodiments, but does not always specify the same subset of embodiments. Moreover, note that numerical values in the preceding embodiments are illustrative examples of some embodiments. In other embodiments of the communication techniques, different numerical values may be used.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. An electronic device, comprising:
    a stack of multiple computer network devices configured to implement a spanning tree using a distributed spanning tree protocol (STP), wherein a given computer network device in the stack comprises:
    a processor; and
    memory configured to store program instructions, wherein, when executed by the processor, the program instructions cause the given computer network device to perform operations comprising:
        creating a virtual internal stacking port, wherein the virtual internal stacking port is included in the spanning tree and provides stacking interface logic that is configured to connect the given computer network device to a virtual hub in the stack that is common to the multiple computer network devices;
        running an instance of the distributed STP that controls ports in the given computer network device, wherein the instance of the distributed STP run by the given computer network device uses a bridge identifier that is common to the multiple computer network devices.

2. The electronic device of claim 1, wherein the distributed STP converges without bridge protocol data unit (BPDU) broadcasts among the multiple computer network devices.

3. The electronic device of claim 1, wherein the electronic device is configured to provide a non-blocking broadcast domain within the multiple computer network devices.

4. The electronic device of claim 1, wherein the virtual internal stacking port is configured to support STP port state machines.

5. The electronic device of claim 4, wherein the supported STP port state machines comprises a transmit/receive state machine.

6. The electronic device of claim 1, wherein the virtual internal stacking port is configured to have STP awareness over the multiple computer network devices in the stack.

7. The electronic device of claim 6, wherein the virtual internal stacking port is configured to aggregate information associated with the distributed STP over the multiple computer network devices in the stack.

8. The electronic device of claim 7, wherein the information comprises a protocol view of ports in the multiple computer network devices.

9. The electronic device of claim 7, wherein the virtual internal stacking port is configured to run a spanning tree state match to obtain the information for virtual internal stacking ports in the multiple computer network devices.

10. The electronic device of claim 9, wherein the spanning tree match uses control packets.

11. The electronic device of claim 1, wherein the spanning tree is compatible with Institute of Electrical and Electronics Engineers (IEEE) 802.1D and IEEE 802.1w.

12. The electronic device of claim 1, wherein the virtual internal stacking port have a protocol status of forwarding, but is incapable of forwarding packets.

13. The electronic device of claim 1, wherein the virtual internal stacking port is not be mapped to a hardware port or resource.

14. The electronic device of claim 1, wherein a largest port identifier in the given computer network device represents the virtual internal stacking port.

15. A non-transitory computer-readable storage medium for use in conjunction with an electronic device that includes a stack of multiple computer network devices that implement a spanning tree using a distributed spanning tree protocol (STP), the computer-readable storage medium storing program instructions that, when executed by a given computer network device, causes the given computer network device to perform operations comprising:
    creating a virtual internal stacking port, wherein the virtual internal stacking port is included in the spanning tree and provides stacking interface logic that connects the given computer network device to a virtual hub in the stack that is common to the multiple computer network devices;
    running an instance of the distributed STP that controls ports in the given computer network device, wherein the instance of the distributed STP run by the given computer network device uses a bridge identifier that is common to the multiple computer network devices.

16. The non-transitory computer-readable storage medium of claim 15, wherein the virtual internal stacking port aggregates information associated with the distributed STP over the multiple computer network devices in the stack.

17. The non-transitory computer-readable storage medium of claim 15, wherein the virtual internal stacking port is not be mapped to a hardware port or resource.

18. A method for implementing a spanning tree using a distributed spanning tree protocol (STP), comprising:
    by a given computer network device in an electronic device that comprises a stack of multiple computer network devices:
    creating a virtual internal stacking port, wherein the virtual internal stacking port is included in the spanning tree and provides stacking interface logic that connects the given computer network device to a virtual hub in the stack that is common to the multiple computer network devices;
    running an instance of the distributed STP that controls ports in the given computer network device, wherein the instance of the distributed STP run by the given computer network device uses a bridge identifier that is common to the multiple computer network devices.

19. The method of claim 18, wherein the virtual internal stacking port aggregates information associated with the distributed STP over the multiple computer network devices in the stack.

20. The method of claim 18, wherein the virtual internal stacking port is not be mapped to a hardware port or resource.

* * * * *